US012450507B2

(12) United States Patent
Sprott

(10) Patent No.: US 12,450,507 B2
(45) Date of Patent: Oct. 21, 2025

(54) AUTOMATIC THEOREM SOLVER

(71) Applicant: Cavenwell Industrial AI Corp., Richmond (CA)

(72) Inventor: Benjamin Sprott, Richmond (CA)

(73) Assignee: CAVENWELL INDUSTRIAL AI CORP.

( * ) Notice: Subject to any disclaimer, the term of this patent is extended or adjusted under 35 U.S.C. 154(b) by 931 days.

(21) Appl. No.: 17/551,965

(22) Filed: Dec. 15, 2021

(65) Prior Publication Data
US 2023/0186123 A1     Jun. 15, 2023

(51) Int. Cl.
| | |
|---|---|
| *G06N 5/04* | (2023.01) |
| *G06F 16/215* | (2019.01) |
| *G06F 16/22* | (2019.01) |
| *G06F 16/2455* | (2019.01) |
| *G06F 16/28* | (2019.01) |
| *G06F 17/18* | (2006.01) |

(52) U.S. Cl.
CPC ........... *G06N 5/041* (2013.01); *G06F 16/215* (2019.01); *G06F 16/221* (2019.01); *G06F 16/2455* (2019.01); *G06F 16/285* (2019.01); *G06F 17/18* (2013.01)

(58) Field of Classification Search
CPC ...... G06F 16/284; G06F 16/288; G06F 16/86; G06F 40/40; G06F 16/221; G06F 16/285; G06F 16/215
USPC ............................................ 707/756; 706/50
See application file for complete search history.

(56) References Cited

U.S. PATENT DOCUMENTS

| | | | | |
|---|---|---|---|---|
| 9,460,189 B2* | 10/2016 | Meijer | ................ | G06F 16/284 |
| 2012/0078974 A1* | 3/2012 | Meijer | ................ | G06F 16/212 |
| | | | | 707/E17.044 |
| 2017/0017670 A1* | 1/2017 | Meijer | ................ | G06F 16/212 |
| 2020/0285932 A1 | 9/2020 | Singh | | |

OTHER PUBLICATIONS

What are the adjunctions that generate the Giry Monad?' In mathoverlow [online] Jan. 19, 2018; 20:07 EST [retrieved on Feb. 1, 2022] Retrieved from the Internet: <URL: https://mathoverflow.net/questions/291083/what-are-the-adjunctions-that-generate-the-giry-monad>.

Map from the Multiset Monad to the Giry Monad: From Data to Probabilities.' In mathoverflow [online] Sep. 16, 2018; 15:58 EST [retrieved on Feb. 1, 2022] Retrieved from the Internet: <URL: https://mathoverflow.net/questions/310704/map-from-the-multiset-monad-to-the-giry-monad-from-data-to-probabilities>.

(Continued)

*Primary Examiner* — Hung T Vy

(57) ABSTRACT

Some embodiments of the present disclosure provide a manner for an automatic theorem solver to answer a query. Ahead of time, data that supports columns is received. The data is converted to a data structure. Sets of univariate and multivariate morphisms are then determined and the numbers of morphisms in the sets may be reduced in accordance with various metrics. Additionally, the morphisms may be used to generate chains of morphisms. A plurality of equations may be selected for a category. Upon receiving the morphisms, chains of morphisms and selected equations, the automatic theorem solver may be ready to receive a query. The automatic theorem solver may then determine an answer to the query and present the answer.

32 Claims, 6 Drawing Sheets

(56) References Cited

OTHER PUBLICATIONS

What is the category of algebras for the finitely supported measures monad?' In mathoverflow [online] Oct. 6, 2018; 3:10 EST [retrieved on Feb. 1, 2022] Retrieved from the Internet: <URL: https://mathoverflow.net/questions/312148/what-is-the-category-of-algebras-for-the-finitely-supported-measures-monad>.

What is the Relative Entropy between distributions X and Y, when Y is a function of X ?' In mathoverflow [online] Dec. 5, 2019; 17:35 EST [retrieved on Feb. 1, 2022] Retrieved from the Internet: <URL: https://mathoverflow.net/questions/347686/what-is-the-relative-entropy-between-distributions-x-and-y-when-y-is-a-fu>.

Finding causation in data with Conditional entropy.' In stackexchange [online] Jun. 13, 2019; 14:42 EST [retrieved on Feb. 1, 2022] Retrieved from the Internet: <URL: https://stats.stackexchange.com/questions/412868/finding-causation-in-data-with-conditional-entropy>.

Feature selection via conditional entropy.' In stackexchange [online] Mar. 1, 2019; 20:14 EST [retrieved on Feb. 1, 2022] Retrieved from the Internet: <URL: https://stats.stackexchange.com/questions/395136/feature-selection-via-conditional-entropy>.

Multivariate conditional entropy.' In stackexchange [online] Dec. 31, 2018; 15:42 EST [retrieved on Feb. 1, 2022] Retrieved from the Internet: <URL: https://stats.stackexchange.com/questions/385091/multivariate-conditional-entropy>.

What is the entropy of a composition of Gaussian Processes?' In stackexchange [online] Oct. 17, 2018; 18:47.EST [retrieved on Feb. 1, 2022] Retrieved from the Internet: <URL: https://stats.stackexchange.com/questions/372410/what-is-the-entropy-of-a-composition-of-gaussian-processes>.

Explainability won't save AI' In brookings [online] May 19, 2021 [retrieved on Jan. 12, 2023] Retrieved from the Internet: <URL: https://www.brookings.edu/techstream/explainability-wont-save-ai>.

Shiebler et al., "Category Theory in Machine Learning," arXiv preprint arXiv:2106.07032 (Jun. 13, 2021).

Sadrzadeh, et al., "The Frobenius anatomy of word meanings I: subject and object relative pronouns.", Journal of Logic and Computation, vol. 23, Issue 6, Dec. 2013, pp. 1293-1317 (2013).

Coecke, et al., "Mathematical Foundations for a Compositional Distributional Model of Meaning," arXive-prints, p. arXiv: 1003.4394, Mar. 2010.

* cited by examiner

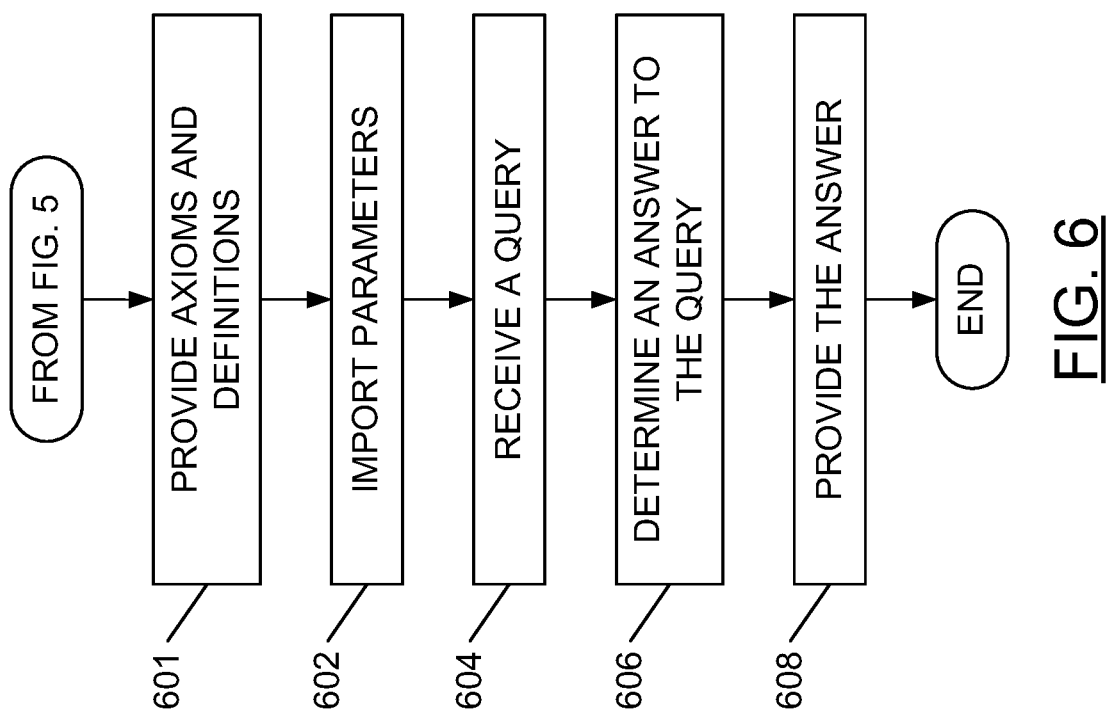

AUTOMATIC THEOREM SOLVER

TECHNICAL FIELD

The present disclosure relates, generally, to theorem solving and, in particular embodiments, to preparing and implementing an automatic theorem solver.

BACKGROUND

Artificial Intelligence (AI) suffers from the problem of explainability, where deep neural nets and other predictive algorithms act like black boxes and do not offer reasons for the directives and predictions they provide their users. When faced with a choice of accepting the directive provided by a modern AI system, a traditional decision-maker faces a dilemma, even if the accuracy of the AI system has been demonstrated. This dilemma relates to whether to leave the decision making, increasingly, to the algorithms and, by extension, to the Engineers and Statisticians responsible for developing the algorithms. One concern is that the Engineers and Statisticians suffer from a lack of domain knowledge. For this reason, there exists a problem in that the traditional decision-makers are hesitant to adopt AI-based predictive and directive tools. Many tactics have been developed to solve this problem. The tactics may be said to fall under the moniker of "Explainable AI." Three tactics, chosen from a list of 17 "Explainable AI" algorithms, are called: Decision trees; Rule lists; and LIME. A recent report out of Brookings (see www.brookings.edu/techstream/explainability-wont-save-ai/) indicates that engineering needs, rather than the needs of traditional decision-makers, are the focus of each of these tactics and most other Machine Learning (ML) research. Indeed, one passage, in Current Explainability efforts, reads, "Two of the engineering objectives—ensuring efficacy and improving performance—appear to be the best represented . . . . Other objectives, including supporting user understanding, . . . , are currently neglected."

SUMMARY

Some embodiments of the present disclosure provide a manner for an automatic theorem solver to answer a query. Ahead of time, data that supports columns is received. The data is converted to a data structure. Sets of univariate and multivariate morphisms are then determined and the numbers of morphisms in the sets may be reduced in accordance with various metrics. Additionally, the morphisms may be used to generate chains of morphisms. A plurality of equations may be selected for a category. Upon receiving the morphisms, chains of morphisms and selected equations, the automatic theorem solver may be ready to receive a query. The automatic theorem solver may then determine an answer to the query and present the answer.

According to an aspect of the present disclosure, there is provided a method for answering a query at a system implementing an automatic theorem prover. The method includes receiving data that supports columns, cleaning the data, binning the data and processing the data, thereby producing processed data. The method further includes, for each pair of columns in the processed data, converting the pair to a data structure, modeling the data structure as a morphism in a category, M, that supports a faithful functor, F: Cat→M, where Cat is the category of small categories, thereby generating a plurality of M-morphisms, converting the plurality of M-morphisms into a corresponding plurality of univariate M-morphisms, associating, with each univariate M-morphism in the plurality of univariate M-morphisms, a data structure metric and selecting, for each column and from the plurality of univariate M-morphisms, a set of univariate M-morphisms, wherein the selecting is based on the data structure metric. The method further includes establishing, for each column, a multivariate M-morphism based on the univariate M-morphisms in the set of univariate M-morphisms that have the each column as a target, associating, with each multivariate M-morphism, a multivariate decision metric, selecting, from the plurality of multivariate M-morphisms, a subset of multivariate M-morphisms, wherein the selecting is based on the multivariate decision metric. The method further includes using the set of univariate M-morphisms and the multivariate M-morphisms to produce a plurality of chains of M-morphisms using morphism composition law in the category, M, and select, from among the plurality of chains of M-morphisms, a subset of chains of M-morphisms, thereby producing a selected subset of chains of M-morphisms. The method further includes obtaining a plurality of equations of a finitely presented category, assigning an equation metric to each equation in the plurality of equations and selecting a plurality of selected equations among the plurality of equations. The method further includes providing, to the automatic theorem prover, axioms of the category, M, and a definition of one or more monoidal products defined in the category, M and axioms associated with the one or more monoidal products, importing, to the automatic theorem prover, the set of univariate M-morphisms, the multivariate M-morphisms, the selected subset of chains of M-morphisms and the plurality of selected equations, receiving, at the automatic theorem prover, a query and determining, at the automatic theorem prover, an answer to the query, wherein the determining the answer is based on: the set of univariate M-morphisms; the subset of multivariate M-morphisms; the selected subset of chains of M-morphisms; the plurality of selected equations; the data structure metrics; the multivariate decision metrics; and the equations metrics. The method further includes providing, at the automatic theorem prover and responsive to the receiving the query, the answer.

BRIEF DESCRIPTION OF THE DRAWINGS

For a more complete understanding of the present embodiments, and the advantages thereof, reference is now made, by way of example, to the following descriptions taken in conjunction with the accompanying drawings, in which:

FIG. 6 illustrates example steps of operating an automatic theorem prover implemented by the system of FIG. 1, in accordance with aspects of the present application.

DETAILED DESCRIPTION OF ILLUSTRATIVE EMBODIMENTS

Figure 1:
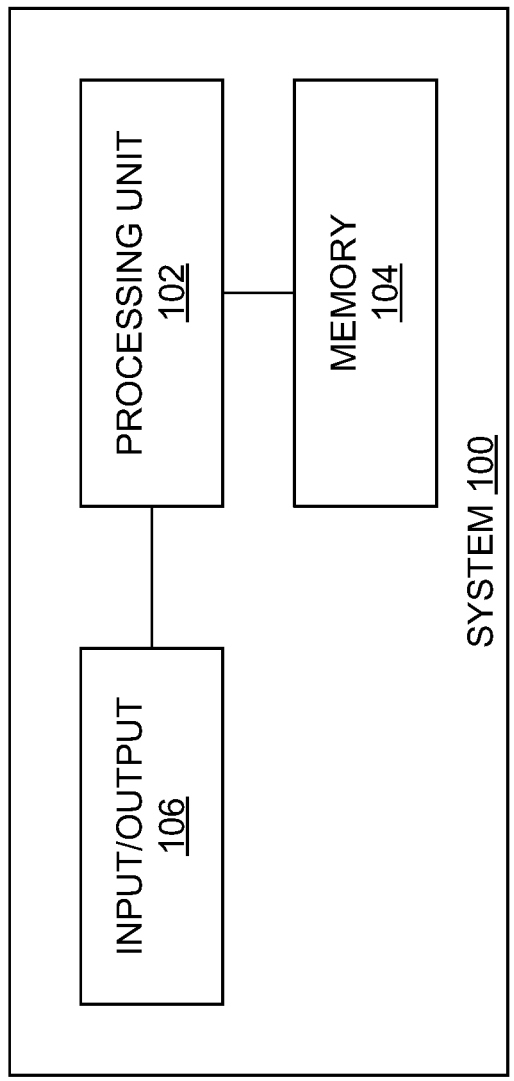
FIG. 1 illustrates, in a block diagram, a system for implementing an automatic theorem solver, in accordance with aspects of the present application.

For illustrative purposes, specific example embodiments will now be explained in greater detail in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include, or otherwise have access to, a non-transitory computer/processor readable storage medium or media for storage of information, such as computer/processor readable instructions, data structures, program modules and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e., DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

When an engineer interacts with data, the engineer may discover that the data may be organized into what are called "columns." A column may be defined as a long list of data, where the ordering of the list may have no meaning. An example of a column might be the reading of a parameter over a number of different serial numbers.

Aspects of the present application relate to a software system that is designed to enhance the abilities of engineers in industrial settings. Such enhancements are expected to allow the engineers to better understand their products and make improvements based on existing data. Aspects of the present application relate to providing a way for a given engineering firm to automatically generate a category that embodies a theory of their products. Conveniently, such automatic generation may be achieved using data already stored in databases maintained by the given engineering firm. Aspects of the present application relate to converting this data into a probabilistic category with likely axioms. Regression of a finitely presented category from the data may be shown to allow for the creation of an interactive tool that may be shown to allow engineers to more powerfully and more completely reason about their products. Once the algebra of the finitely presented category has been determined, the finitely presented category may be combined with an automatic theorem prover as a core engine for an interactive assistant.

As a starting point, it may be considered that a column is a multiset, m, over a set, S. It may be shown that all multisets over a set may be described by a multiset monad, $(\mathcal{M}, \mu, \eta)$.

It may also be shown that any pair of columns is a map in a Kleisli category, $K_\mathcal{M}$, of the multiset monad. Composition of columns is given by a composition rule of the Kleisli category, $K_\mathcal{M}$, of the multiset monad. It may further be shown that there exists a natural transformation from the multiset monad to a monad of measures of finite support. This natural transformation may be shown to induce a natural transformation on the Kleisli category, $\mathcal{N}$: $K_\mathcal{M} \to K_{fin}$, where $K_{fin}$ is the Kleisli category for the monad of measures of finite support. Notably, $K_{fin}$ may also be referred to as "the Distribution Monad." Indeed, the Kleisli category for the monad of measures of finite support, $K_{fin}$, is arguably a category of sets and stochastic matrices. Conditional entropy is known to be a map from $K_{fin}$ to $\mathbb{R}$. The conditional entropy of a map in the Kleisli category for the monad of measures of finite support, $K_{fin}$, may be understood to be a measure that defines a degree to which a map in the Kleisli category of the multiset monad, $K_\mathcal{M}$, represents a function. When an M-morphism exactly represents a function, it is called a deterministic morphism as we see in Shiebler, Dan, Bruno Gavranović and Paul Wilson, "Category Theory in Machine Learning," arXiv preprint arXiv: 2106.07032 (2021). The conditional entropy for a map, f, is zero if the map, f, exactly specifies a function. A composition for maps in the Kleisli category for the monad of measures of finite support, $K_{fin}$, may be obtained by matrix multiplication.

Given a set, C, of all columns in a database, D, one can define a C×C matrix. Each element of the C×C matrix may be identified with maps in the Kleisli category for the monad of measures of finite support, $K_{fin}$. Each element of the C×C matrix may be mapped to $\mathbb{R}$. using conditional entropy. The lowest ten percent of column pairs with respect to conditional entropy may then be selected.

Using the knowledge of the columns from which the column pairs are selected, a set, Com, of all valid composites may be constructed. Then, using a metric of similarity between morphisms in the Kleisli category for the monad of measures of finite support, $K_{fin}$, the top ten percent of equations may be selected. That is, the top most likely commutative triangles are selected. The selected equations may be shown to be of the form f·g=h. The same process may be used to obtain the top ten percent of commutative squares. One way to define the degree to which two maps in the Kleisli category for the monad of measures of finite support, $K_{fin}$, are the same is by adding up a Kullback-Leibler divergence at each element of the X in the map definition of X→M(Y).

One problem when comparing column pairs (C×C vs. D×D) is that the availability of a pair of data columns does not guarantee the availability of enough information to fully specify the Kleisli map f: X→FIN(X), where FIN is a functor of the monad of measures of finite support. This is because the value of the function at x∈X may not have ever been measured. For this reason, some missing data is to be filled in pairs of columns are to be compared. To carry out this data filling, the column pairs C×C and D×D may be reviewed. Upon finding a domain value, x, in the column pair C×C but not in the column pair D×D, then domain value, x, may be added to the column pair D×D, using uniform distribution.

Notably, the entire set, X, from which the columns are sampled need not be covered. Instead, coverage may be limited to a maximum subset of domain values that appear in all the columns.

Thus, given two maps f and g in the Kleisli category for the monad of measures of finite support, $K_{fin}$, if KL(f,g) is the Kullback-Leibler divergence between distributions f(x) and g(x), then a similarity between maps f and g is a real value given by $$S(f, g) = \sum_{x \in X} KL(f(x), g(x))$$

This value of the similarity, S(f,g), is expected to go to zero in the case wherein the maps f and g represent the same information about the same function.

FIG. 1 illustrates elements of a system 100 configured to implement aspects of the present application. The system 100 includes a processing unit 102 with an associated memory 104. The system 100 also includes an input/output interface 106.

Figure 2:
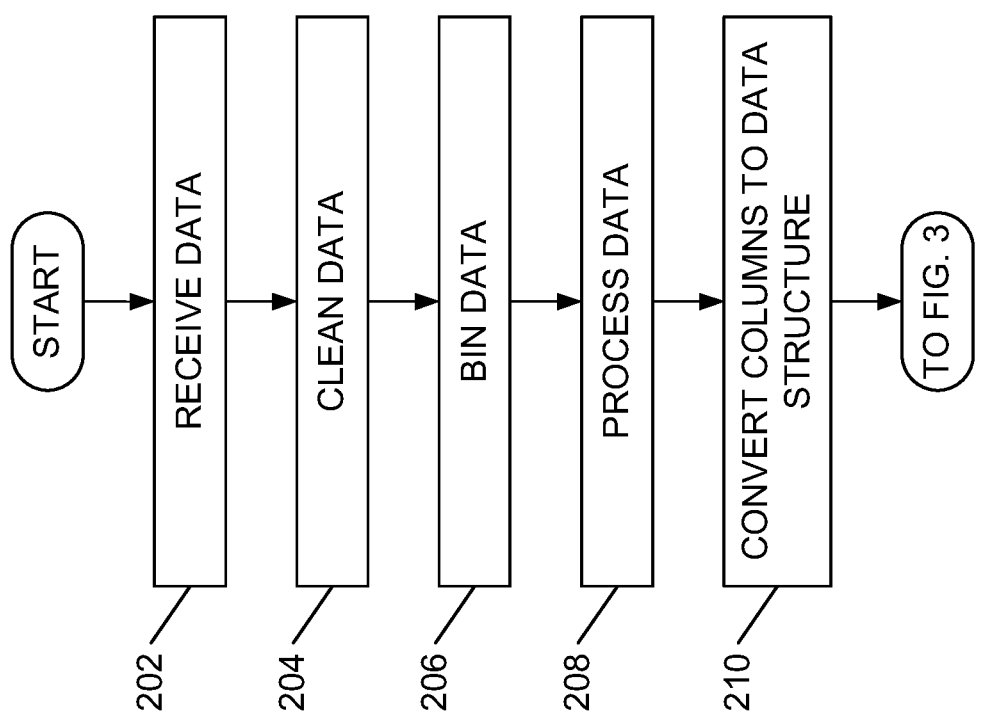
FIG. 2 illustrates example initial steps in a method of answering a query, in accordance with aspects of the present application.

FIG. 2 illustrates example initial steps in a method of answering a query.

The method of FIG. 2 begins with the system 100 of FIG. 1 receiving (step 202) data that supports columns. Receiving (step 202) the data may also be called "reading in" the data. As discussed hereinbefore, a column may be defined as a long list of data, where the ordering of the list may have no meaning. An example of a column might be the reading of a parameter over a number of different serial numbers.

Upon receiving (step 202) the data, the system 100 may clean (step 204) the data. The cleaning (step 204) the data may, for example, involve removing a not-a-number. The cleaning (step 204) the data may, for example, involve removing a constant column. The cleaning (step 204) the data may, for example, involve removing an outlier.

The system 100 may also bin (step 206) all real number data in to a number, N, of bins. The binning (step 206) of the data may be accomplished in a conventional manner.

The system 100 may process (step 208) the data reduce the data to include only those pairs of interest. The processing (step 208) of the data may, for example, include removing, from the data, pairs for which the first column, $C_1$, contains elements that are unique. The processing (step 208) of the data may, for example, include removing, from the data, pairs for which all the elements of the second column, $C_2$, are the same. The processing (step 208) of the data may, for example, include removing, from the data, pairs wherein the first column, $C_1$, is approximately equal to the second column, $C_2$. That is, the first column, $C_1$, may be compared to the second column, $C_2$, in a manner that generates an equality score. Determining that the two columns are approximately equal may involve comparing the equality score to an equality threshold.

Figure 3:
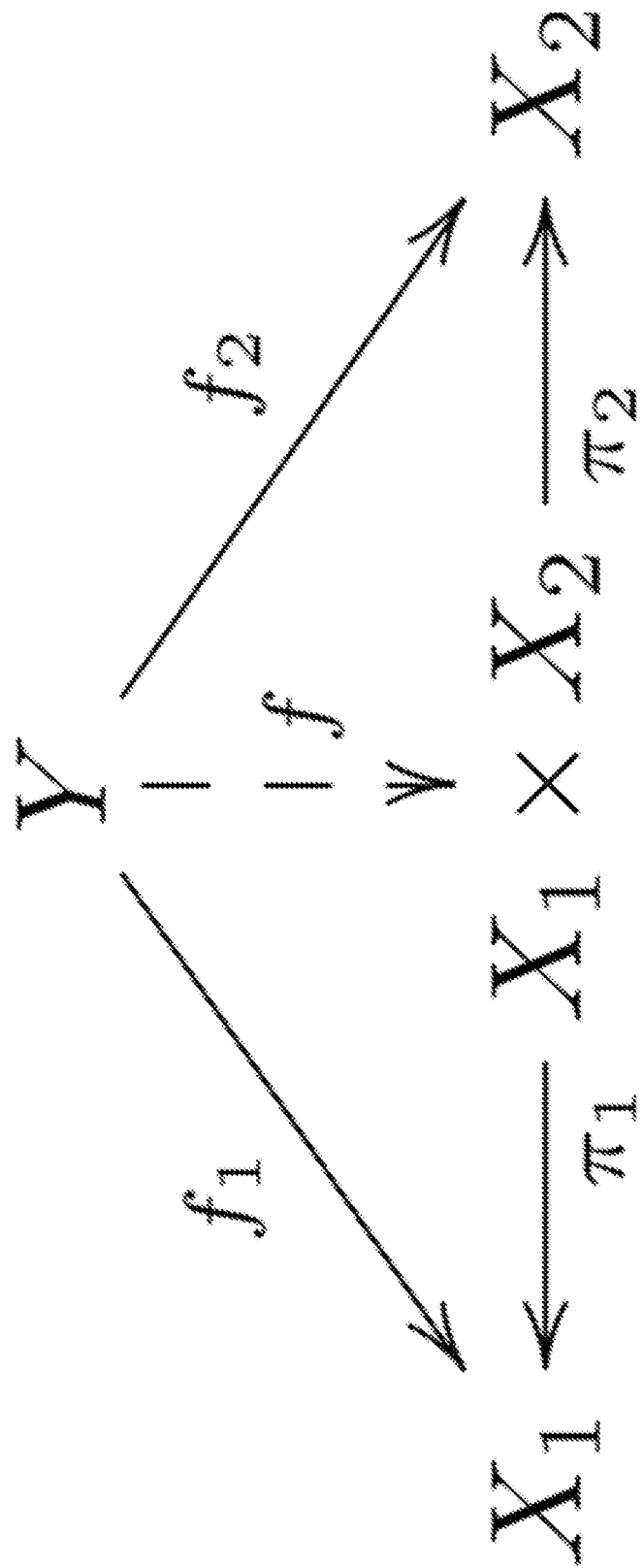
FIG. 3 illustrates a diagram showing a cartesian product in a category.

By way of the processing (step 208) of the data, the system 100 may obtain one or more universal constructions. Universal constructions appear frequently in categories. (See ncatlab.org/nlab/show/universal+construction and en.wikipedia.org/wiki/Universal_property). The prototypical example of a universal construction is the universal construction of the Cartesian Product in the Category of Sets. Other examples of universal constructions include Limits/Colimits, Kan Extensions and Adjoint Functor. The Cartesian product is an example of a limit and can be detected in a data set consisting of rows and columns. FIG. 3 illustrates a diagram showing a cartesian product in a category. In FIG. 3, X, Y, $X_1$ and $X_2$ are objects in the category. $X_1 \times X_2$ is the product of the objects $X_1$ and $X_2$. There are morphisms $f_1$, f and $f_2$. For the object labelled $X_1 \times X_2$ to be the product of objects $X_1$ and $X_2$, it must be the case that the diagram in FIG. 3 must commute. This means that every path along the morphisms must be equal. There is a path from Y to $X_1 \times X_2$ to $X_1$ and the path is traversed by "going along" the morphism f, then along the morphism $\pi_1$. One can also get from Y to $X_1$ by going along the morphism $f_1$. These two paths have to be the same, so $f \cdot \pi_1 = f_1$; likewise, $f \cdot \pi_2 = f_2$. The exact definition is as follows: For every object Y and every pair of morphisms $f_1 : Y \to X_1$, $f_2 : Y \to X_2$, there exists a unique morphism $f_1 : Y \to X_1 \times X_2$ such that diagram in FIG. 3 commutes. In any given data set, there is always only one map between columns, thus f is always unique, so one must only verify the two equations. This verification can be done with an algorithm disclosed herein, where chains and equations are computed. The verification will apply to any limit or colimit.

Each pair of columns [$C_1$, $C_2$], including a first column, $C_1$, and a second column, $C_2$, may be converted (step 210) to a data structure, K. Preferably, the data structure, K, can be modeled as a morphism in a category, M, that supports a faithful functor F: Cat→M, where Cat is the category of small categories. The category, M, may be a Markov category.

Figure 4:
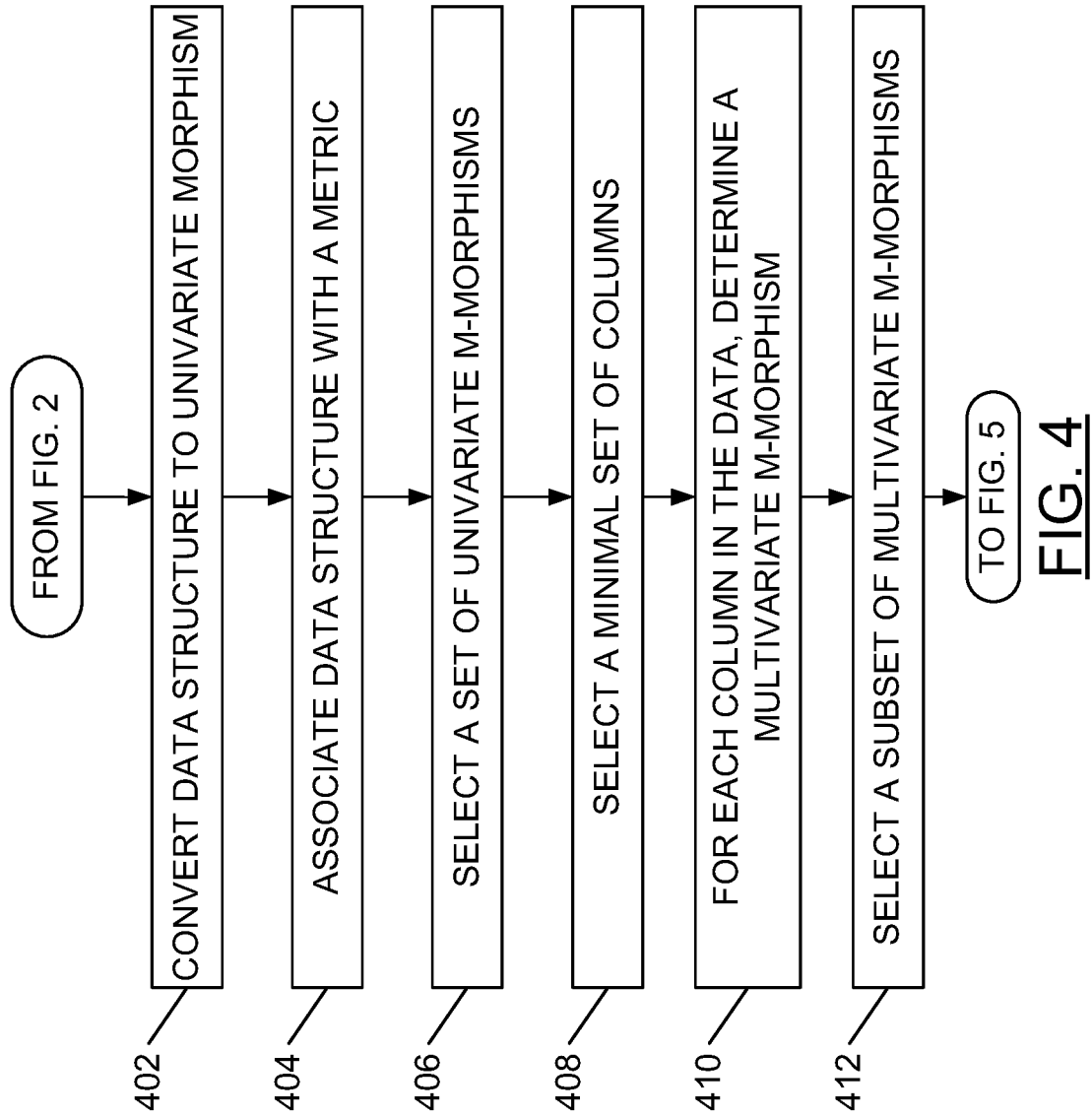
FIG. 4 illustrates example steps in the method started in FIG. 2, in accordance with aspects of the present application.

FIG. 4 illustrates example steps in the method started in FIG. 2. For each pair of columns remaining in the processed data, the system 100 may convert (step 402) the data structure, K, (already modeled as a morphism in a category, M) to a univariate morphism. The univariate morphism may, for example, be a univariate morphism in the Kleisli category of the Distribution Monad (KIDM).

The system 100 may then associate (step 404) the data structure, K, with a data structure metric, m.

For every column, $C_1$, in the processed data, the system 100 may select (step 406) a set, $SC_1$, of univariate M-morphisms. Notably, the codomain of each of the univariate M-morphisms in the set, $SC_1$, is $C_1$. The selecting (step 406) may be based on the data structure metric, m, associated, in step 404, with the data structure, K, that was converted (step 402) to the univariate M-morphism.

Given a target column, T, where every univariate M-morphism selected in step 406 has target column, T, as its target, a minimum spanning tree algorithm may be performed, using these univariate M-morphisms, to select (step 408) a minimal set of source columns (called "$s_T$") that are to be used in the subsequent step (step 410), which relates to determining an original multivariate M-morphism whose target is target column, T.

The original multivariate M-morphism may be called "$f_T$" such that the original multivariate M-morphism may be represented as $f_T : s_T \to T$, with a set of source nodes (columns), $s_T$, and a target node (column), T. The multivariate M-morphism, $f_T$, may be considered to be a directed graph in at least two ways. In one way, the multivariate M-morphism, $f_T$, may be considered a directed graph, G1, that is a collection of directed edges pointing into a target node, T, with each edge coming from a separate source node in the set of source nodes, $s_T$. In one way, the multivariate M-morphism, $f_T$, may be considered a bigger directed graph, G2, that contains the graph G1, but includes all the edges between the columns/nodes in the set of source nodes, $s_T$. Furthermore, the original multivariate M-morphism, $f_T$, may be converted into a circuit by using substitution, thereby reducing the number of elements in the set, $s_T$, of source columns. The conversion may be regarded as converting the original multivariate M-morphism, $f_T$, to a converted multivariate M-morphism, $f_T'$. The converted multivariate M-morphism, $f_T'$, may be regarded as a circuit wherein the minimal set, $s_T$, of source columns is replaced with a smaller set, $s_T'$, of source columns.

The smaller set, $s_T'$, of source columns may be found as a set of nodes with no incoming edges. That is, nodes that have no causal precursors. Finding a set of nodes with no incoming edges may be accomplished by starting at each node in the graph and proceeding backwards (i.e., in the reverse direction of the arrow of the directed graph) until a node that has no incoming edges is encountered. These nodes (columns) with no incoming edges have no causal precursors and may, accordingly, be considered to be part of the smaller set, $s_T'$, of source columns.

The original multivariate M-morphism, $f_T$, may then be discarded and, instead, the converted multivariate M-morphism, $f_T'$, may be kept, where $f_T': s_T' \rightarrow T$. This dimensionality reduction may be performed for each multivariate M-morphism using both the standard composition rule in the category, M, and composition according to one or more monoidal products defined in the category, M.

The system 100 may next determine (step 410) a multivariate M-morphism. Determining (step 410) the multivariate M-morphism may be based on the univariate M-morphisms, $C_1$, in the set, $SC_1$, of univariate M-morphisms that have a codomain that is a specific column, T. The system 100 may, additionally, perform dimensionality reduction on the determined multivariate M-morphism, as described in the preceding, and may associate, with the multivariate M-morphism, a multivariate decision metric, $m_{mult}$.

The system 100 may select (step 412), from the plurality of multivariate M-morphisms, a subset of multivariate M-morphisms, wherein the selecting is based on the multivariate decision metric, $m_{mult}$. The system 100 may select (step 412) a predetermined proportion of the multivariate M-morphisms that are associated with optimum values for the multivariate decision metric, $m_{mult}$. The selecting (step 412) may involve selecting the multivariate M-morphisms associated with a value of the multivariate decision metric, $m_{mult}$, below a multivariate M-morphism threshold. The multivariate decision metric, $m_{mult}$, may, for one example, be implemented as a conditional-entropy-based decision metric. The multivariate decision metric, $m_{mult}$, may, for another example, be implemented as a mutual-information-based decision metric.

Figure 5:
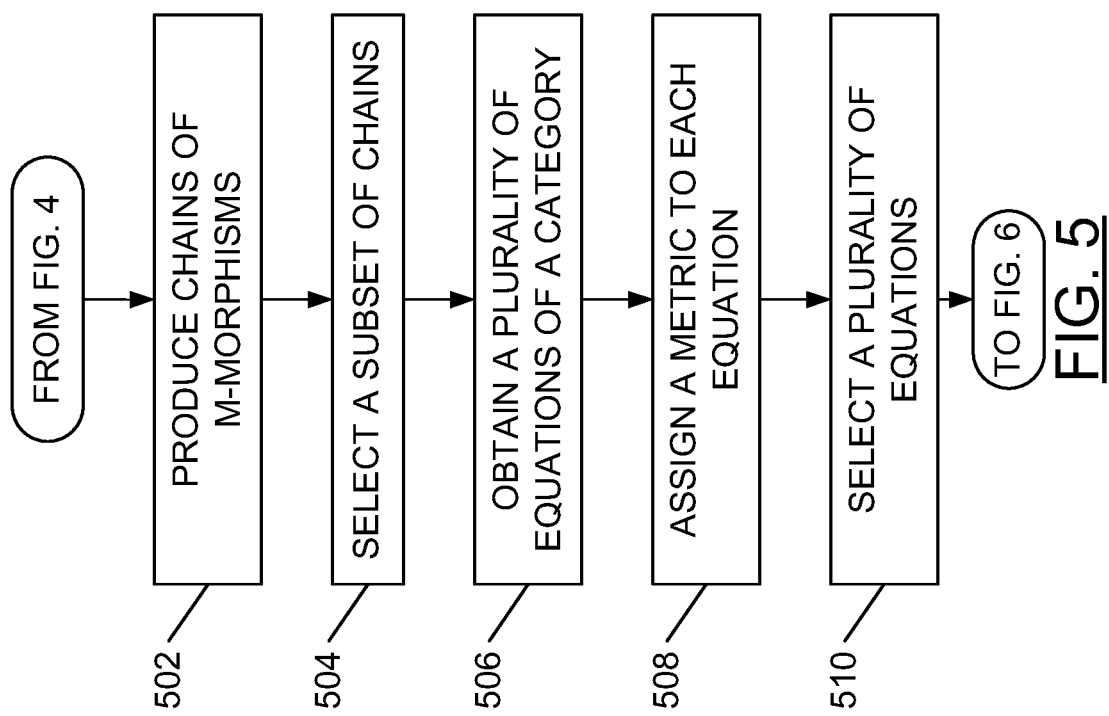
FIG. 5 illustrates example steps in the method continued in FIG. 4, in accordance with aspects of the present application.

FIG. 5 illustrates example steps in the method continued in FIG. 4. The system 100 may produce (step 502) a plurality of chains of M-morphisms. In particular, producing (step 502) the plurality of chains of M-morphisms may involve using the univariate M-morphisms and the selected multivariate M-morphisms. More particularly, the system 100 may use a morphism composition law, in the category, M, to produce (step 502) the plurality of chains of M-morphisms. The system 100 may also produce circuits, rather than just the chains produced in step 502, using both the morphism composition law, in the category, M, and one or more monoidal products defined the category, M.

Producing (step 502) the plurality of chains of M-morphisms may involve carrying out a recursive, depth-first graph traversal. For a given M-morphism, f, the processing unit 102 carries out the traversal by determining whether the depth of the given M-morphism, f, is less than a given depth value, d. If, for example, the given M-morphism, f, is a composite of two morphisms h and j, called hj, and neither of h and j are composites, then the "depth" of the given M-morphism, f, is 2. Next, the processing unit 102 carries out the traversal by determining the target column, $t_f$, of the given M-morphism, f. The processing unit 102 further carries out the traversal by determining a list, V, of M-morphisms for which the column $t_f$ is the source column. In other words, V is the list of all M-morphisms pointing out of column $t_f$. The processing unit 102 further carries out the traversal by iterating over the list, V, doing the following at each iteration. The processing unit 102 selects an element from the list, V. The selected elements may be called the M-morphism g. The processing unit 102 determines whether either f or g represent unique keys. An M-morphism is considered a unique key if either the source column or the target column contains unique values (i.e., no value is seen more than once in the column). Upon determining that either f or g represent unique keys, the iteration may be considered complete and the processing unit 102 may select a new element from the list, V. The processing unit 102 may check that the M-morphism, g, is not already in the composite, f, i.e., the processing unit 102 does not wish to intersect itself. Upon determining that the M-morphism, g, is in the composite, f, the iteration may be considered complete and the processing unit 102 may select a new element from the list, V. The processing unit 102 may then compose f and g together to produce a new M-morphism, called gf. The processing unit 102 may then determine whether the decision metric of gf is below a decision metric threshold. Upon determining that the decision metric of gf is above the decision metric threshold, the processing unit 102 may store the composite gf in a composites list, LC. Upon determining that the decision metric of gf is below the decision metric threshold, the iteration may be considered complete and the processing unit 102 may select a new element from the list, V. The processing unit 102 may recursively carry out this method, passing in the new composite, gf, instead of f. Upon completion, the plurality of chains may be considered to have been produced (step 502) in that the plurality of chains are the elements in the composites list, LC.

It should be clear that further processing fewer than all the plurality of chains of M-morphisms may still result in a beneficial effect. Accordingly, the system 100 may select (step 504), from among the plurality of chains of M-morphisms, a subset of chains of M-morphisms. The selecting (step 504) may be based on a morphism chain metric. In particular, chains of M-morphisms in the selected subset of chains of M-morphisms may be the chains of M-morphisms that are associated with a value of the morphism chain metric below a morphism chain metric threshold.

The system 100 may obtain (step 506) a plurality of equations of a finitely presented category, D. The obtaining (step 506) the plurality of equations of the finitely presented category, D, may, for example, involve using a system trained using a gradient descent algorithm.

The system 100 may assign (step 508) an equation metric to each equation in the plurality of equations. The equation metric may be a metric based on a Kullback-Leibler divergence.

The system 100 may then select (step 510) a plurality of selected equations among the plurality of equations. The selecting (step 510) may, for example, be based upon the equation metric assigned (step 508) to each equation among the plurality of equations. In particular, the plurality of selected equations may be the equations associated with a value of the equation metric below an equation metric threshold.

FIG. 6 illustrates example steps of operating an automatic theorem prover implemented by the system 100. The system 100 may provide (step 601), to the automatic theorem prover: axioms of the category, M; a definition of one or more monoidal products defined in the category, M; and axioms associated with the one or more monoidal products. The system 100 may also provide (step 601), to the automatic theorem prover, the one or more universal constructions obtained from the data (see step 208, FIG. 2). The automatic theorem prover may be provided with axioms of a monoidal category. Alternatively, the automatic theorem prover may be provided with axioms of the Kleisli category of the distribution monad. The automatic theorem prover may include a graphical user interface that allows for manual and assisted proofs, thereby taking advantage of the standard composition rule in the category, M, and one or more monoidal products defined in the category, M.

The automatic theorem prover may import (step 602) the plurality of selected M-morphisms, the plurality of selected chains of M-morphisms, the plurality of selected equations and the plurality of associated metrics. The plurality of associated metrics may include the multivariate decision metrics, $m_{mult}$, associated with the multivariate M-morphisms, the morphism chain metrics associated with the plurality of selected chains of M-morphisms and the equation metrics associated with the plurality of selected equations.

The automatic theorem prover may receive (step 604) a query. Receiving (step 604) a query may, for example, involve receiving a query in natural language. The natural language of the query may have grammar that is supported by the axioms that have been provided to the automatic theorem prover. The natural language of the query may have grammar that is supported by monoidal category axioms that have been provided to the automatic theorem prover. The natural language of the query may have grammar that is supported by axioms that have been provided to the automatic theorem prover and wherein the axioms include axioms of a Kleisli Category of a Distribution Monad.

The automatic theorem prover may determine (step 606) an answer to the query. The determining (step 606) of the answer to the query may be based on the plurality of selected M-morphisms, the plurality of selected chains of M-morphisms, the plurality of selected equations and the plurality of associated metrics.

The automatic theorem prover may then provide (step 608) the answer. Notably, the answer, provided (step 608) by the automatic theorem prover, may take the form of a binary answer. That is, the answer may be "true" or "false."

Further notably, where the selecting (step 406, FIG. 4) the set of univariate M-morphisms involves selecting all of the plurality of univariate M-morphisms, the selecting (step 412, FIG. 4) the subset of multivariate M-morphisms involves selecting all of the plurality of multivariate M-morphisms, the selecting (step 4404, FIG. 5) the subset of chains of M-morphisms involves selecting all of the plurality of chains of M-morphisms and the selecting (step 510, FIG. 5) the plurality of selected equations involves selecting all the plurality of equations, the answer, provided (step 608) by the automatic theorem prover, may take the form of a metric representative of a degree of confidence that the answer is "true" or a degree of confidence that the answer is "false." The degree may be considered a likelihood.

It should be appreciated that one or more steps of the embodiment methods provided herein may be performed by corresponding units or modules. For example, data may be transmitted by a transmitting unit or a transmitting module. Data may be received by a receiving unit or a receiving module. Data may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method for answering a query at a system implementing an automatic theorem prover, the method comprising:

receiving, from a database in a memory, data that supports columns;

cleaning the data;

binning the data;

processing the data, thereby producing processed data;

for each pair of columns in the processed data, converting the pair to a data structure;

modeling the data structure as a morphism in a category, M, that supports a faithful functor, F:Cat→M, where Cat is a category of small categories, thereby generating a plurality of M-morphisms;

converting the plurality of M-morphisms into a corresponding plurality of univariate M-morphisms;

associating, with each univariate M-morphism in the plurality of univariate M-morphisms, a data structure metric;

selecting, for each column and from the plurality of univariate M-morphisms, a set of univariate M-morphisms, wherein the selecting is based on the data structure metric;

establishing, for each column, a multivariate M-morphism based on the univariate M-morphisms, in the set of univariate M-morphisms that have the each column as a target;

associating, with each multivariate M-morphism, a multivariate decision metric;

selecting, from the plurality of multivariate M-morphisms, a subset of multivariate M-morphisms, wherein the selecting is based on the multivariate decision metric;

using the set of univariate M-morphisms and the multivariate M-morphisms to:

produce a plurality of chains of M-morphisms using morphism composition law in the category, M, wherein the producing includes carrying out a recursive, depth-first graph traversal; and select, from among the plurality of chains of M-morphisms, a subset of chains of M-morphisms, thereby producing a selected subset of chains of M-morphisms;

obtaining a plurality of equations of a finitely presented category;

assigning an equation metric to each equation in the plurality of equations;

selecting a plurality of selected equations among the plurality of equations;

providing, to the automatic theorem prover:
  axioms of the category, M;
  a definition of one or more monoidal products defined in the category, M; and
  axioms associated with the one or more monoidal products;

importing, to the automatic theorem prover, the set of univariate M-morphisms, the multivariate M-morphisms, the selected subset of chains of M-morphisms and the plurality of selected equations;

receiving, at the automatic theorem prover, a query, wherein the receiving employs an input interface;

determining, at the automatic theorem prover, an answer to the query, wherein the determining the answer is based on:
  the set of univariate M-morphisms;
  the subset of multivariate M-morphisms;
  the selected subset of chains of M-morphisms;
  the plurality of selected equations;
  the data structure metrics;
  the multivariate decision metrics; and
  the equations metrics;

providing, at the automatic theorem prover and responsive to the receiving the query, the answer, wherein the providing employs an output interface.

2. The method of claim 1, wherein the processing the data comprises rejecting pairs with at least one column containing elements that are all unique.

3. The method of claim 1, wherein the processing the data comprises rejecting pairs for which all the elements are the same in one of the columns in the pair.

4. The method of claim 1, wherein the processing the data comprises rejecting pairs of columns with a similarity that exceeds a threshold of equality.

5. The method of claim 1, wherein the category, M, is the Kleisli category of the distribution monad.

6. The method of claim 1, wherein the category, M, is the Kleisli category of the Giry monad.

7. The method of claim 1, wherein the multivariate decision metric comprises a conditional-entropy-based decision metric.

8. The method of claim 1, wherein the multivariate decision metric comprises a mutual-information-based decision metric.

9. The method of claim 1, wherein the selected M-morphisms comprise M-morphisms associated with a value of the multivariate decision metric below a multivariate M-morphism threshold.

10. The method of claim 1, wherein the selecting the subset of multivariate M-morphisms comprise selecting a predetermined proportion of the multivariate M-morphisms that are associated with optimum values for the multivariate decision metric.

11. The method of claim 1, wherein chains of M-morphisms in the selected subset of chains of M-morphisms comprise the chains of M-morphisms that are associated with a value of the morphism chain metric below a morphism chain metric threshold.

12. The method of claim 1, wherein the plurality of selected equations comprise the equations associated with a value of the equation metric below an equation metric threshold.

13. The method of claim 1, wherein the equation metric comprises a metric based on a Kullback-Leibler divergence.

14. The method of claim 1, wherein the cleaning the data comprises removing a not-a-number.

15. The method of claim 1, wherein the cleaning the data comprises removing a constant column.

16. The method of claim 1, wherein the cleaning the data comprises removing an outlier.

17. The method of claim 1, wherein the answer is one of true and false.

18. The method of claim 1, wherein the selecting the set of univariate M-morphisms involves selecting all of the plurality of univariate M-morphisms, the selecting the subset of multivariate M-morphisms involves selecting all of the plurality of multivariate M-morphisms, the selecting the subset of chains of M-morphisms involves selecting all of the plurality of chains of M-morphisms and the selecting the plurality of selected equations involves selecting all the plurality of equations and the answer comprises a metric representative of a degree of confidence that the answer is a particular answer.

19. The method of claim 1, where the obtaining the plurality of equations of the finitely presented category comprises using a system trained using a gradient descent algorithm.

20. The method of claim 1, further comprising providing, to the automatic theorem prover, axioms of a monoidal category.

21. The method of claim 1, further comprising providing, to the automatic theorem prover, axioms of the Kleisli category of the distribution monad.

22. The method of claim 1, wherein receiving the query comprises receiving natural language whose grammar is supported by axioms provided to the automatic theorem prover.

23. The method of claim 1, wherein receiving the query comprises receiving natural language whose grammar is supported by monoidal category axioms provided to the theorem prover.

24. The method of claim 1, wherein receiving the query comprises receiving natural language whose grammar is supported by axioms provided to the automatic theorem prover, including axioms of a Kleisli Category of a Distribution Monad.

25. The method of claim 1, further comprising selecting, with a minimum spanning tree algorithm, a minimal set of source columns for each multi-dimensional M-morphism.

26. The method of claim 1, further comprising performing dimensionality reduction for each multivariate M-morphism, the dimensionality reduction using both a standard composition rule in the category, M, and composition according to the one or more monoidal products defined in the category, M.

27. The method of claim 26, further comprising providing axioms of Markov categories so that the automatic theorem prover may take advantage of the axioms of Markov categories.

28. The method of claim 1, where the automatic theorem prover includes a graphical user interface that allows for manual and assisted proofs taking advantage of a standard composition rule in the category, M, and the one or more monoidal products defined in the category, M.

29. The method of claim 28, further comprising providing axioms of Markov categories so that the automatic theorem prover may take advantage of the axioms of Markov categories.

30. The method of claim 1, wherein the category, M, comprises a Markov Category.

31. The method of claim 1, wherein the processing the data further comprises obtaining, from the data, a universal construction.

32. The method of claim 31, wherein the providing comprises providing, to the automatic theorem prover, the universal construction.

* * * * *